United States Patent
Denning

(10) Patent No.: US 7,385,795 B2
(45) Date of Patent: Jun. 10, 2008

(54) CORDLESS POWER TOOL WITH A PROTECTED WEAK LINK ELEMENT

(75) Inventor: Bruce S. Denning, Fallbrook, CA (US)

(73) Assignee: O2Micro International Limited, Georgetown Grand Caymon (KY)

(*) Notice: Subject to any disclaimer, the term of this patent is extended or adjusted under 35 U.S.C. 154(b) by 175 days.

(21) Appl. No.: 11/110,256

(22) Filed: Apr. 20, 2005

(65) Prior Publication Data

US 2005/0248318 A1 Nov. 10, 2005

Related U.S. Application Data

(60) Provisional application No. 60/568,038, filed on May 4, 2004.

(51) Int. Cl.
*H02H 3/00* (2006.01)
*H02H 7/00* (2006.01)
*H02H 9/02* (2006.01)
*H02H 5/04* (2006.01)
*H02H 7/08* (2006.01)

(52) U.S. Cl. ............... 361/101; 320/134; 361/100; 361/18; 361/23; 388/903

(58) Field of Classification Search ......... 320/134, 320/114; 318/434; 361/18, 23, 100, 101; 307/10.7; 388/903
See application file for complete search history.

(56) References Cited

U.S. PATENT DOCUMENTS

| | | | |
|---|---|---|---|
| 2,354,138 A | | 7/1944 | Parsons |
| 5,657,417 A | * | 8/1997 | Di Troia ............ 388/829 |
| 5,717,306 A | | 2/1998 | Shipp |
| 5,905,645 A | * | 5/1999 | Cross ............ 363/65 |
| 5,945,803 A | | 8/1999 | Brotto et al. |
| 6,560,417 B1 | | 5/2003 | Rodriguez |
| 6,646,845 B1 | * | 11/2003 | Turner et al. ............ 361/86 |

(Continued)

FOREIGN PATENT DOCUMENTS

CN 1041264 1/1996

(Continued)

OTHER PUBLICATIONS

European Communication dated Aug. 22, 2005 received in corresponding European Patent Application Serial No. 05009394.7 (3 pages).

(Continued)

*Primary Examiner*—Gary L Laxton
*Assistant Examiner*—Ramy Ramadan
(74) *Attorney, Agent, or Firm*—Grossman, Tucker, Perreault & Pfleger PLLC

(57) ABSTRACT

A method consistent with an embodiment may include selecting one of a plurality of components of a power supply system of a cordless power tool to be a protected weak link element. The method may also include configuring the protected weak link element to fail from an overload condition before failure of a remainder of the plurality of components from the overload condition, monitoring a power condition of the protected weak link element, and protecting the protected weak link element from the overload condition to thereby also protect the remainder of the components from the overload condition. A battery pack and a cordless power tool are also provided.

8 Claims, 4 Drawing Sheets

U.S. PATENT DOCUMENTS

| | | | |
|---|---|---|---|
| 6,695,837 | B2 | 2/2004 | Howell |
| 6,809,649 | B1 | 10/2004 | Wendelrup et al. |
| 6,892,310 | B1 | 5/2005 | Kutz et al. |
| 6,913,087 | B1 | 7/2005 | Brotto et al. |
| 2002/0138159 | A1 | 9/2002 | Atkinson |
| 2003/0057864 | A1* | 3/2003 | Smith ..................... 315/209 R |
| 2003/0096158 | A1 | 5/2003 | Takano et al. |
| 2005/0077878 | A1* | 4/2005 | Carrier et al. ............... 320/134 |

FOREIGN PATENT DOCUMENTS

| | | |
|---|---|---|
| EP | 0622863 | 2/1994 |
| EP | 0588613 | 3/1994 |
| EP | 0691731 | 1/1996 |
| EP | 0721247 A2 | 7/1996 |
| JP | 07107029 | 4/1995 |
| JP | 07007864 | 10/1995 |
| JP | 0691731 | 10/1996 |
| WO | 2005038952 | 4/2005 |

OTHER PUBLICATIONS

International Search Report with Written Opinion dated Nov. 22, 2006 received in corresponding International Patent Application Serial No. PCT/US05/013874 (8 pages).

International Preliminary Report on Patentability with Written Opinion dated Feb. 1, 2007 received in corresponding International Patent Application Serial No. PCT/US2005/013874 (5 pages).

International Search Report with Written Opinion dated Nov. 15, 2005 received in corresponding International Patent Application Serial No. PCT/US05/13862.

English language translation of Japanese Office Action dated Nov. 14, 2006.

English language translation of Japanese Office Action dated May 22, 2007.

English language translation of China Office Action dated Mar. 9, 2007.

English language translation of Taiwan Office Action dated Jun. 6, 2007.

English translation of Chinese Office Action dated Nov. 2, 2007 recieved in corresponding Chinese Application No. 2005100683409 (8 pages).

Supplementary European Search Report issued in related European Patent Application No. 05779998 dated Apr. 3, 2008 ( 3 pages).

* cited by examiner

CORDLESS POWER TOOL WITH A PROTECTED WEAK LINK ELEMENT

CROSS REFERENCE TO RELATED APPLICATIONS

This application claims the benefit of the filing date of U.S. Provisional Application Ser. No. 60/568,038, filed May 4, 2004, the teachings of which are incorporated herein by reference.

FIELD

The present disclosure relates to cordless power tools and, more particularly, to a cordless power tool with a protected weak link element.

BACKGROUND

A wide variety of cordless power tools are available that may be utilized in different applications such as construction applications, fire and rescue applications, etc. Some examples of cordless power tools include, but are not limited to, cordless drills, cordless circular saws, cordless reciprocating saws, cordless sanders, cordless screwdrivers, and flashlights. Cordless power tools may utilize a rechargeable battery pack for providing power to operate the tool. The rechargeable battery pack may be readily removed from the cordless power tool and coupled to an external battery charger for charging purposes.

The battery pack may include one or more battery cells. The battery cells may be nickel-cadmium or nickel-metal hydride cells. Other types of cells such as lithium ion cells may also be utilized. Since lithium ion cells may suffer from degraded performance or may become hazardous if charged above a specified level or discharged below a specified level, monitoring circuitry may be incorporated into the battery pack to monitor cell voltage levels. The monitoring circuitry may also monitor current levels flowing into or out of the battery pack. A sense resistor in the battery pack may be utilized to provide a signal to the monitoring circuitry representative of current flow. The sense resistor contributes an additional expense and contributes to power losses. The power losses are exacerbated with increasing current levels utilized in high current cordless power tools such as a drill or circular saw.

Accordingly, there is a need to remove the sense resistor and provide a weak link protection system for a cordless power tool.

BRIEF SUMMARY OF THE INVENTION

According to one aspect of the invention, there is provided a cordless power tool. The cordless power tool may include a battery pack including at least one battery cell, a motor to drive an element of the cordless power tool, the motor being powered by the at least one battery cell. The cordless power tool may also include a protected weak link element configured to fail from an overload condition before one of the at least one battery cell and the motor fails from the overload condition. The cordless power tool may also include monitoring circuitry configured to monitor a power condition of the protected weak link element. The monitoring circuitry may further be configured to protect the protected weak link element from the overload condition in response to the monitored power condition, to thereby also protect the at least one battery cell and the motor from the overload condition.

According to another aspect of the invention, there is provided a method. The method may include: selecting one of a plurality of components of a power supply system of a cordless power tool to be a protected weak link element; configuring the protected weak link element to fail from an overload condition before failure of a remainder of the plurality of components from the overload condition; monitoring a power condition of the protected weak link element; and protecting the protected weak link element from the overload condition to thereby also protect the remainder of the components from the overload condition.

According to yet another aspect of the invention there is provided a battery pack. The battery pack may include at least one battery cell, a switch coupled to the at least one battery cell, and monitoring circuitry to monitor a voltage drop across the switch and to open the switch if the voltage drop is greater than or equal to a threshold level, the threshold level selected to protect the at least one battery cell from an overload condition.

BRIEF DESCRIPTION OF THE DRAWINGS

Features and advantages of embodiments of the claimed subject matter will become apparent as the following Detailed Description proceeds, and upon reference to the Drawings, where like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
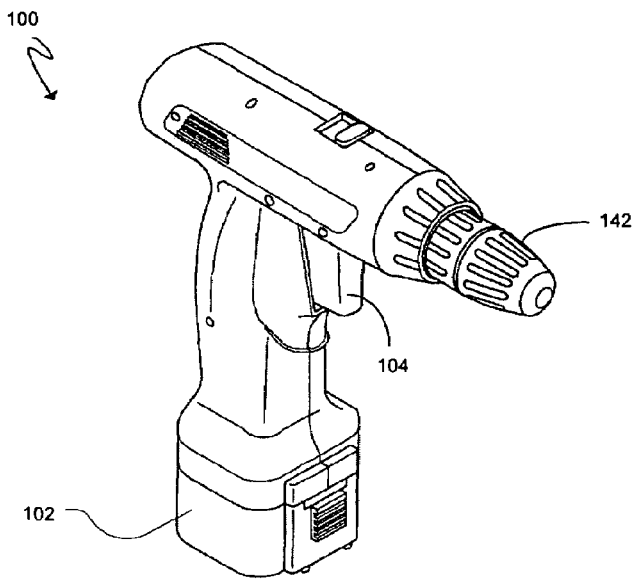
FIG. 1 is a perspective view of a cordless power tool.

FIG. 1 is a perspective view of a cordless power tool 100. The cordless power tool 100 is illustrated as a cordless drill and may be described as such in relation to embodiments herein. However, the cordless power tool 100 may be any type of cordless power tool including, but not limited to, a cordless circular saw, a cordless reciprocating saw, a cordless sander, a cordless screwdriver, and a flashlight. The cordless power tool may include a rechargeable battery pack 102 for providing power to operate the tool 100. The rechargeable battery pack 102 may be readily removed from the cordless power tool 100 and coupled to an external battery charger for charging purposes. The cordless power tool 100 may also include a speed control trigger 104. A user may depress and release the speed control trigger 104 to control the speed of the chuck 142.

Figure 2:
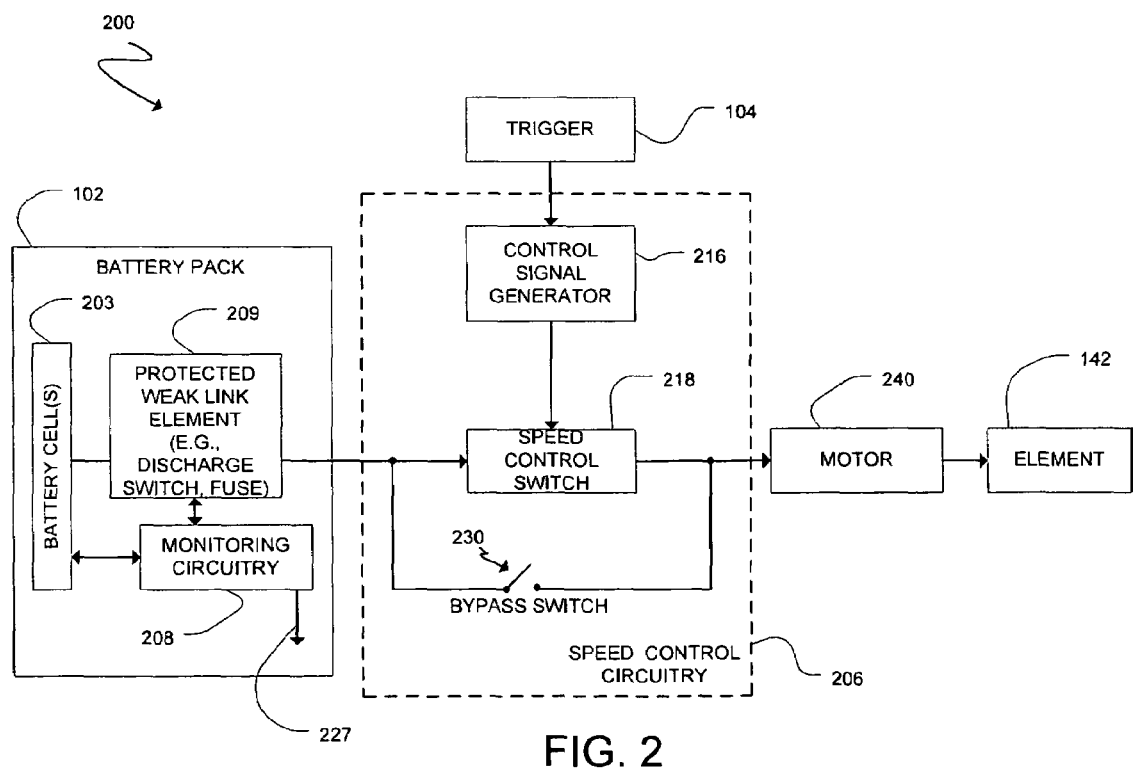
FIG. 2 is a diagram of a power supply system for the cordless power tool of FIG. 1 having a protected weak link element.

FIG. 2 is a diagram of a power supply system 200 for the cordless power tool of FIG. 1. The power supply system 200 may include the battery pack 102, speed control circuitry 206, the trigger 104, a motor 240, and an element 142 that may be driven by the motor 240 through an associated gear train. The element 142 may be the chuck of the drill that holds a drill bit. As used in any embodiment herein, "circuitry" may comprise, for example, singly or in any combination, hardwired circuitry, programmable circuitry, state machine circuitry, and/or firmware that stores instructions executed by programmable circuitry.

The battery pack 102 may include one or more battery cells 203 to provide power for the system 200. The battery cells 103 may be lithium ion cells in one embodiment. The battery pack 102 may provide power to the motor 240 and other loads of the system 200. The battery pack 102 may also include monitoring circuitry 208. The monitoring circuitry 208 may measure one or more of battery pack current, temperature, cell voltage levels for each battery cell, and a voltage drop across an element.

The monitoring circuitry 208 may compare monitor power conditions to associated threshold levels. The monitoring circuitry 208 may also identify an overload condition if one of the measured quantities is greater than or equal to the associated threshold level. For example, an overload condition may be a discharge current level from the battery cells 103 greater than or equal to a threshold level representative of a maximum discharge current level. In another example, an overload condition may be a charging current level to the battery cells 103 greater than or equal to a threshold level representative of a maximum charging current. In yet another example, an overload condition may be a voltage level of a battery cell greater than or equal to a voltage threshold. In yet another embodiment, an overload condition may be a temperature of a component greater than or equal to a temperature threshold. Upon detection of an overload condition, the monitoring circuitry 208 may provide an output control signal to protect components of the power supply system 200. The output control signal may be provided to one or more switches within the battery pack 102 or may be provided as a control input to other circuitry located outside the battery pack 102 via path 227.

The battery pack 102 may also include a protected weak link element 209. The protected weak link element 209 may be a discharge switch of the battery pack 102 in one embodiment. In another embodiment, the protected weak link element 209 may be a fuse. The fuse may include, but not be limited to, a fusable link, a fast or slo-blo automotive fuse, or a small gauge wire.

Although illustrated as being part of the battery pack 102, the protected weak link element 209 may also be located elsewhere in the power supply system 200. The protected weak link element 209 may be configured to fail from an overload condition before a remainder of the components of the power supply system 200 fails from the overload condition. Therefore, by protecting the protected weak link element 209 from an overload condition, the remaining components of the power supply system 200 may also be protected. If the monitoring circuitry 208 fails to protect the protected weak link element 209, the protected weak link element 209 should fail before other components of the power supply system fail and therefore act as a type of final fuse to provide an additional protection mechanism.

The protected weak link element 209 may be a switch such as a discharge switch in the battery pack 102 or the speed control switch 218. When the protected weak link element 209 is a switch, the overload condition may be detected by the monitoring circuitry 208 and the monitoring circuitry 208 may provide a control signal to the switch to open the switch. When the weak link protection element 209 is a fuse, the overload condition may also be detected by the monitoring circuitry 208. The overload condition may be a monitored voltage drop across the fuse equal to a greater than a threshold level. Upon detection of the overload condition, the monitoring circuitry 208 may provide a control signal to a switch to open the switch, e.g., the discharge switch in one instance.

The speed control circuitry 206 may be responsive to the position of the trigger 104 to adjust the speed of the element 142 driven by the motor 240. The speed control circuitry 206 may include a control signal generator 216, a speed control switch 218, and a bypass switch 230. The control signal generator 216 may be responsive to the position of the trigger 104 to provide a control signal. The speed control switch 218 may, in turn, be responsive to the control signal from the control signal generator 216 to adjust the speed of the motor 240 which in turn adjusts the speed of the element 142 driven by the motor 240. If the position of the trigger 104 is indicative of full speed, the speed control switch 218 may be mechanically bypassed by the bypass switch 230 in order to prevent heat build up in the speed control switch 218 which may be sensitive to heat build up.

Figure 3:
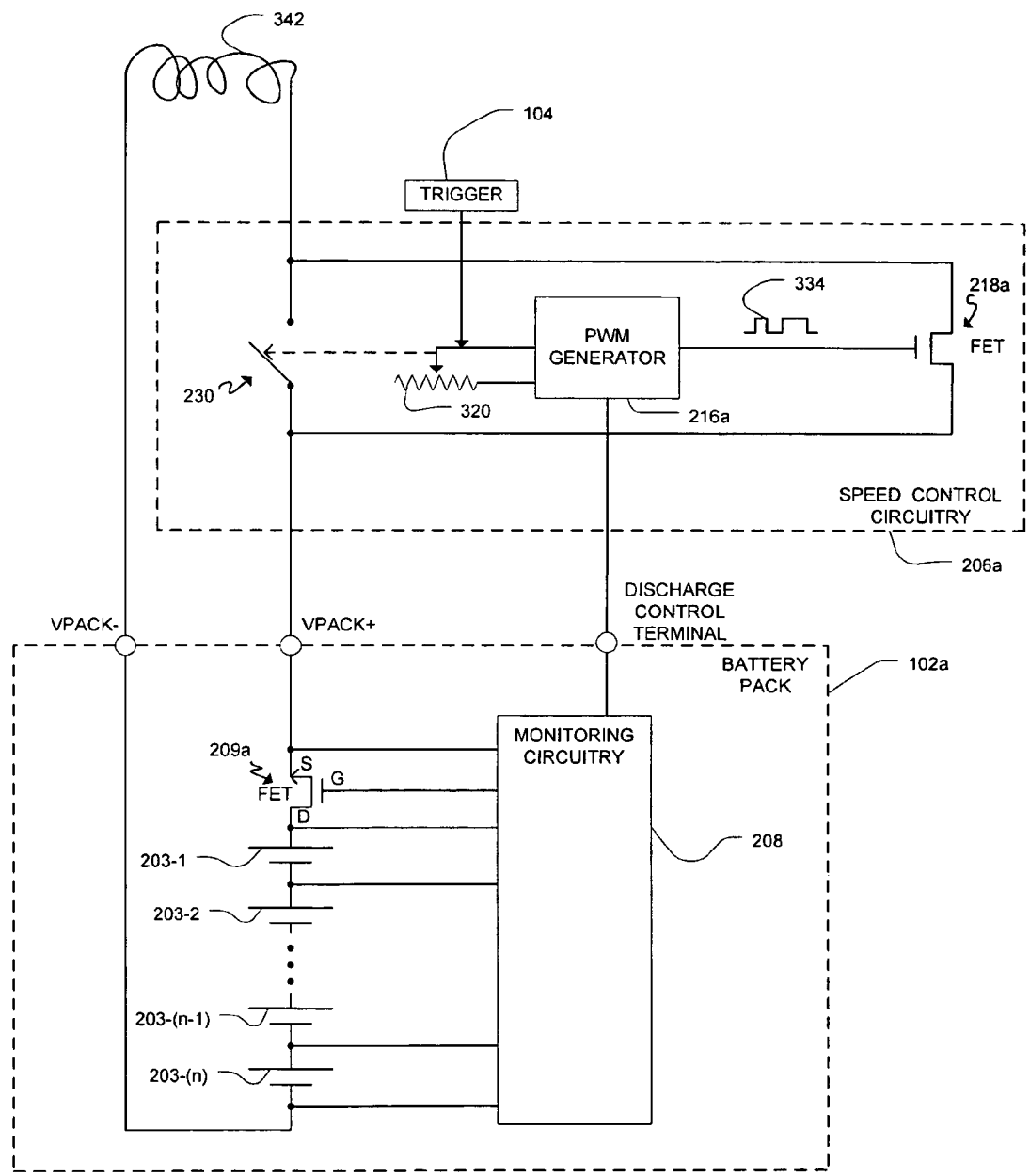
FIG. 3 is a diagram of an embodiment of the power supply system of FIG. 2.

FIG. 3 is a diagram of an embodiment of the power supply system of FIG. 2. In this embodiment, the protected weak link element 209 may be a discharge switch 209a of the battery pack 102a. The discharge switch 209a may be a field effect transistor (FET). The FET may be a metal oxide semiconductor field effect transistor (MOSFET) such as a p-channel MOSFET (PMOS) or n-channel MOSFET (NMOS). The battery pack 102a may also include a plurality of battery cells 203-1, 203-2, 203-(n−1), and 203-n. The battery pack 102a may supply power to a number of loads including a motor winding 342.

An embodiment of the speed control circuitry 206a may include the bypass switch 230, a variable resistor 320, a pulse width modulation (PWM) generator 216a, and an FET transistor 218a acting as the speed control switch 218. In operation, a user may depress the trigger 104 a desired amount to control the speed of the element 142. In response to the position of the trigger 104, the resistance of the variable resistor 320 may change. The PWM generator 216a may then be responsive to the resistance of the variable resistor 320 to modify the duty cycle of the PWM signal 334 provided to the FET transistor 218a. The PWM signal 234 may operate at a fixed frequency, e.g., such as 5 to 10 KHz. As the duty cycle of the PWM signal is increased, the ON time of FET transistor 218a is increased and hence the speed of the element 142 of the power tool is also increased. Similarly, as the duty cycle of the PWM signal is decreased, the ON time of the FET transistor 218a is decreased and hence the speed of the element 142 of the power tool is decreased. In one example, the duty cycle of the PWM signal may vary from about 10% (slow speed) to 75% (fast speed). If the trigger 104 position is indicative of full speed, the FET transistor 218a may be mechanically bypassed by closing the switch 230 and opening the speed control switch 218 in order to prevent heat build up in the FET transistor 218a and decrease full ON resistance.

Figure 4:
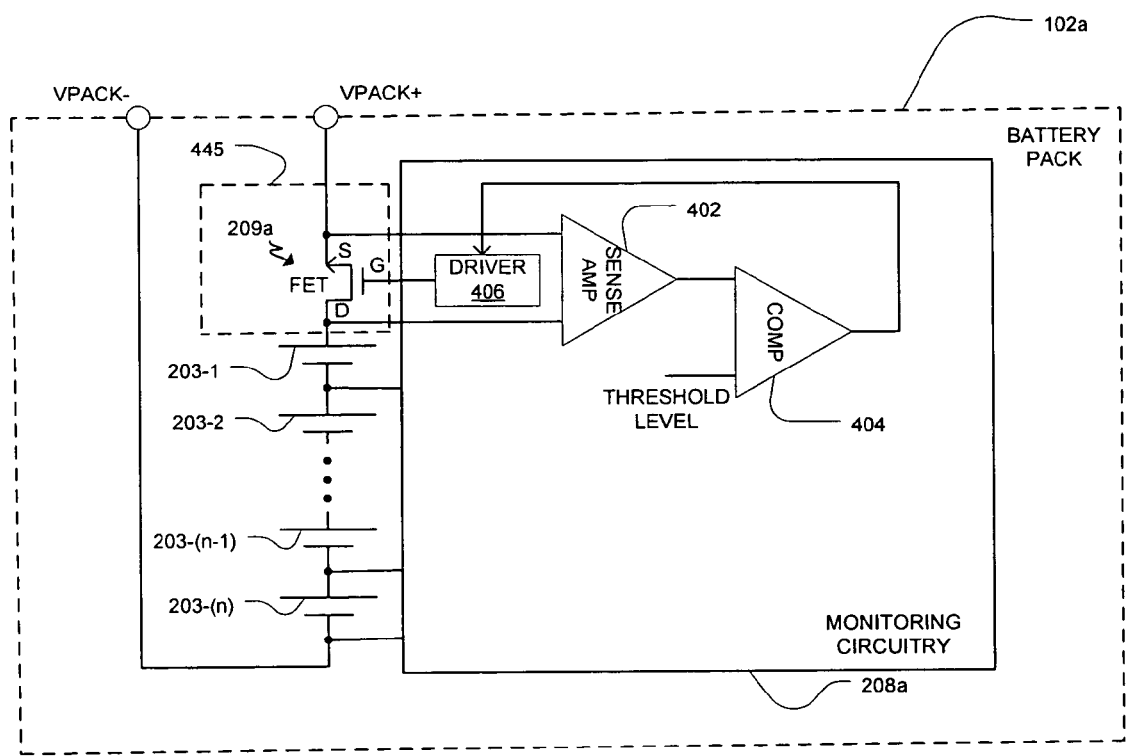
FIG. 4 is a diagram of an embodiment of the monitoring circuitry of FIG. 3.

Turning to FIG. 4 in conjunction with FIG. 3, an embodiment of the monitoring circuitry 208a consistent with the monitoring circuitry 208 of FIG. 3 is illustrated. The monitoring circuitry 208a may monitor a power condition of the protected weak link element, e.g., a voltage drop across the discharge switch 209a, and provide a control signal to the discharge switch 209a instructing it to open in case of an overload condition. The opening of the discharge switch 209a thereby protects other components of the power supply system from an overload condition. In one example, the overload condition may be a discharge current level greater than or equal to a maximum discharge current level. Hence, a conventional sense resistor may be eliminated from the battery pack 102. If the protected weak link element 209 is a fuse, the monitoring circuitry 208 may similarly monitor the voltage drop across the fuse and provide a control signal to the discharge switch 209a, or some other switch of the power supply system, instructing it to open in case of an overload condition to thereby protect the protected weak link element 209 from the overload condition.

The discharge switch 209a may be implemented as an FET and may be referred to as such herein. The source and drain terminals of the FET 209a may be coupled to a sense amplifier 402 to amplify the drain to source voltage. The sense amplifier 402 may then provide an output signal to the comparator 404. The comparator 404 may also receive a threshold level at another input. The comparator 404 may then provide an output signal to the driver 406 if the signal from the sense amplifier 402 is greater than or equal to the threshold level. The driver 406 may be responsive to this output from the comparator 404 to open the discharge switch 209a.

The monitoring circuitry 208a may therefore be configured to shut down the protected weak link element, or in this case open the discharge switch 209a, just before it fails. Therefore, by protecting the protected weak link element 209a, the other components in the power supply system are also protected. If the monitoring circuitry 208a fails to shut down the FET 209a, it will self destruct and act as a final fuse. Therefore, the FET 209a may be isolated from other components, e.g., the battery cells 203-1, 203-2, 203-(n−1), and 203-n, of the battery pack 102 so that they are protected from possible failure of the FET 209a. The FET 209a may be isolated by enclosing or encapsulating the FET 209a, e.g., by enclosure 445.

With an FET as the protected weak link element, e.g., the discharge switch 209a or the speed control switch 218a, the FET may be selected to have a relatively high drain to source resistance Rds(on). In one embodiment, the FET may have a Rds(on) of about 3.0 milliohms at a junction temperature of about 30 degrees Celsius which increases with as the junction temperature increases. Another FET having an even higher Rds(on) of about 5-7 milliohms at a junction temperature of about 30 degrees Celsius may be utilized. This has the added benefit of generally being a less expensive FET. Heat sinking in the FET may also be deliberately limited to guarantee that the FET will fail from overheating before (but not very long before) other components in the power supply system are damaged. The FET ON resistance Rds will increase as it heats up. This increased resistance provides a useful degree of amplification of the sensed voltage across the FET.

In one example, an FET having part number IR IRL1404Z FET provided by International Rectifier may be utilized for the FET. The IR IRL1404Z FET may have an Rds resistance that increases from 1.0 times normal at a 30 degree Celsius junction temperature to about 1.5 times normal at a 120 degree Celsius junction temperature. The more the FET heats up, the sooner overload detection as detected by the monitoring circuitry 208 shuts it down. The FET, FET drive, and heatsinking may be specified so that the FET will fail just before any other element of the power supply system might fail (this should also be the least expensive FET and heatsinking solution). By then designing the overload trip to shut down the FET just before it fails, we protect the weakest link in the power chain, and therefore everything else.

The protected weak link element 209 therefore protects the components of the power supply system of the cordless power tool from an overload condition. These components include, but are not limited to:

1. The battery cell(s) 203. Battery cell protection requirements are typically provided by the cell vendor, but presumably include concerns about electrochemical problems caused by extended rapid discharge, and heat buildup.
2. The conductive paths. The conduction paths generally should not be a problem, as the wires should be sized to survive any permitted overload condition.
3. The speed control switch 218. Full ON operation should not be a problem, as the speed control switch 218 may be mechanically bypassed. Full electronic mode (maybe 75% PWM) may present a problem, due to potential heat build up in the electronic switch FET 218, if the speed control FET does not already incorporate thermal protection.
4. The motor 240. Full power operation (especially locked rotor full power operation) may heat the motor rapidly.
5. A battery pack switch (e.g., FET 209a). Assuming (for example) use of the IR IRL1404Z "Automotive MOSFET": Vdss=40V, Rds(on)=3.1 mOhm, Id=75 A. At the 70 A overload trip current and the rated Rds(on), the FET would dissipate 0.22V*70 A=15 W. That is well within the rated 230 W dissipation of the package, but heat would need to be dissipated considering the current may be even higher and the trip timeout may be as long as 30 seconds. Worse, the Rds (ON resistance) will increase as the temperature increases (1.5 times larger at 120 degrees Celsius compared to 30 degrees Celsius). If the battery pack heat sinking is insufficient, then the junction temperature and Rds (ON resistance) will continue to rise until the FET is destroyed.

If the monitoring circuitry 208 fails to shut down the FET in time, the protected weak link element will still self destruct, and act as a final fuse. Again, a fuse may also be used as the protected weak link element instead of an FET if desired (this might be the case if the battery pack 102 did not include a discharge control switch, but instead stops discharge by means of a control line to the speed control circuitry 206). The voltage drop across the fuse may be utilized by the monitoring circuitry. The fuse resistance may increase even more sharply than an FET's ON resistance as its temperature approaches the melting point further assisting in providing a voltage drop value that may be easily measured.

Figure 5:
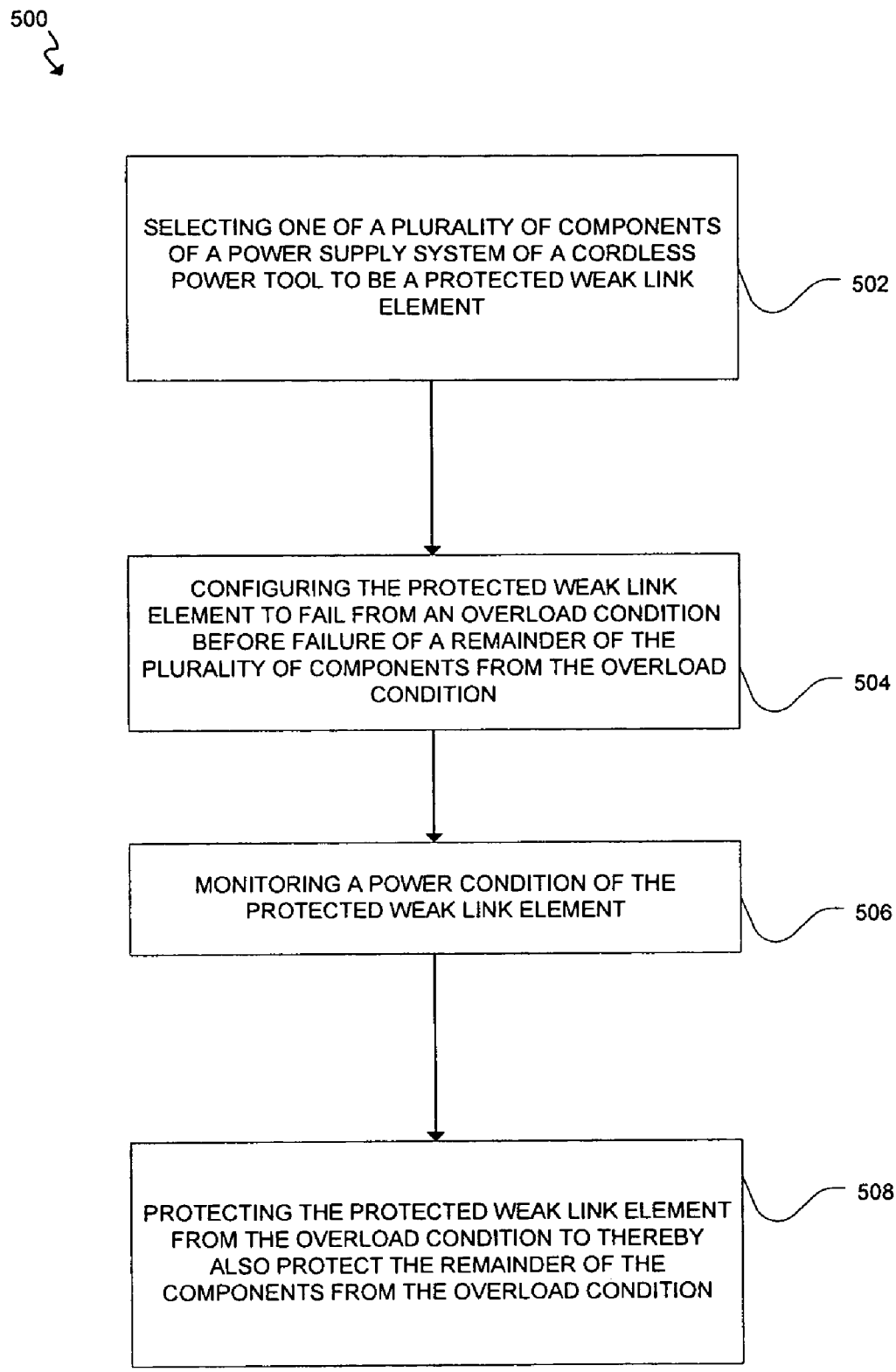
FIG. 5 is a flow chart of operations consistent with an embodiment.

FIG. 5 illustrates operations 500 according to an embodiment. Operation 502 may include selecting one of a plurality of components of a power supply system of a cordless power tool to be a protected weak link element. Operation 504 may include configuring the protected weak link element to fail from an overload condition before failure of a remainder of the plurality of components from the overload condition. Operation 506 may include monitoring a power condition of the protected weak link element. Finally, operation 508 may include protecting the protected weak link element from the overload condition to thereby also protect the remainder of the components from the overload condition.

Advantageously, a conventional sense resistor utilized in the battery pack 102 may be eliminated providing cost savings and simplifying configuration complexity. This also reduces power losses attributable to the sense resistor which may become excessive for high current draw cordless power tools. By protecting the protected weak link element, other components in the power supply system for the cordless power tool are also protected. The protected weak link element may be positioned to aid in accessibility to it. The protected weak link element may also be selected to be a relatively inexpensive component compared to other components of the power supply system. A power condition such a voltage drop across the protected weak link element may be monitored. The voltage drop may be representative of current flow through the protected weak link element. By protecting the weak link element, e.g., by halting current flow or limiting current flow if the overload condition is excessive current, other components are also protected. Only if the monitoring circuitry fails to protect the protected weak link element will the protected weak link element fail thereby providing a failsafe type operation.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible.

What is claimed is:

1. A cordless power tool comprising:
    a battery pack comprising at least one battery cell and a discharge switch coupled to said at least one battery cell, said discharge switch comprising a field effect transistor (FET), wherein said FET has a drain to source resistance of about 3.0 milliohms at a junction temperature of about 30 degrees Celsius, and wherein said drain to source resistance increases as said junction temperature increases;
    a motor to drive an element of said cordless power tool, said motor being powered by said at least one battery cell;
    a protected weak link element configured to fail from an overload condition before one of said at least one battery cell and said motor fails from said overload condition wherein said protected weak link element comprises said discharge switch; and
    monitoring circuitry configured to monitor a power condition of said protected weak link element wherein said power condition comprises a voltage drop across a source and a drain terminal of said FET, said monitoring circuitry further configured to protect said protected weak link element from said overload condition in response to said monitored power condition, and to thereby also protect said at least one battery cell and said motor from said overload, said monitoring circuitry comprising a sense amplifier configured to receive at least one signal from said protected weak link element and to generate a first output signal to a comparator, said comparator configured to receive said first output signal and a threshold level and to generate a second output signal to a driver if said first output signal is greater than or equal to said threshold level, said driver configured to protect said protected weak link element from a failure by opening said discharge switch if said voltage drop is greater than or equal to said threshold level, said threshold level set so that said monitoring circuitry is configured to open said discharge switch before a failure of said discharge switch.

2. The cordless power tool of claim 1, wherein said protected weak link element comprises a fuse and said power condition comprises a voltage drop across said fuse.

3. The cordless power tool of claim 1, wherein said discharge switch is isolated from said battery pack so that said battery pack is protected from a failure of said discharge switch.

4. A method comprising:
    selecting one of a plurality of components of a power supply system of a cordless power tool to be a protected weak link element, wherein said protected weak link element comprises a discharge switch of a battery pack, said discharge switch coupled to at least one battery cell of said battery pack, said discharge switch comprising a field effect transistor (FET), wherein said FET has a drain to source resistance of about 3.0 milliohms at a junction temperature of about 30 degrees Celsius, and wherein said drain to source resistance increases as said junction temperature increases;
    configuring said protected weak link element to fail from an overload condition before failure of a remainder of said plurality of components from said overload condition;
    monitoring a power condition of said protected weak link element via monitoring circuitry wherein said power condition comprises a voltage drop across a source and a drain terminal of said FET, wherein said monitoring operation comprises comparing said voltage drop to a threshold level, said monitoring circuitry comprising a sense amplifier configured to receive at least one signal from said protected weak link element and to generate a first output signal to a comparator, said comparator configured to receive said first output signal and said threshold level and to generate a second output signal to a driver if said first output signal is greater than or equal to said threshold level; and
    protecting said protected weak link element from said overload condition via said driver to thereby also protect said remainder of said components from said overload condition, wherein said protecting operation comprises opening said discharge switch if said voltage drop is greater than or equal to said threshold level, said threshold level set so said opening of said discharge switch occurs before a failure of said discharge switch.

5. The method of claim 4, wherein said protected weak link element comprises a fuse and said power condition comprises a voltage drop across said fuse.

6. The method of claim 4, further comprising:
    isolating said discharge switch from said battery pack so that said battery pack is protected from a failure of said discharge switch.

7. A battery pack comprising:
    at least one battery cell;
    a discharge switch coupled to said at least one battery cell, wherein said discharge switch comprises a field effect transistor (FET), wherein said FET has a drain to source resistance of about 3.0 milliohms at a junction temperature of about 30 degrees Celsius, and wherein said drain to source resistance increases as said junction temperature increases; and
    monitoring circuitry to monitor a voltage drop across a source and a drain terminal of said FET and to open said discharge switch if said voltage drop is greater than or equal to a threshold level, said threshold level selected to protect said at least one battery cell from an overload condition, wherein said overload condition comprises a maximum discharge current from said at least one battery cell, said monitoring circuitry comprising a sense amplifier configured to receive at least one signal from said switch and to generate a first output signal to a comparator, said comparator configured to receive said first output signal and a threshold level and to generate a second output signal to a driver if said first output signal is greater than or equal to said threshold level, said driver configured to protect said discharge switch.

8. The battery pack of claim 7, wherein said discharge switch is isolated from said battery pack so that said battery pack is protected from a failure of said discharge switch.

* * * * *

UNITED STATES PATENT AND TRADEMARK OFFICE
CERTIFICATE OF CORRECTION

| | | |
|---|---|---|
| PATENT NO. | : 7,385,795 B2 | Page 1 of 1 |
| APPLICATION NO. | : 11/110256 | |
| DATED | : June 10, 2008 | |
| INVENTOR(S) | : Denning | |

It is certified that error appears in the above-identified patent and that said Letters Patent is hereby corrected as shown below:

On the title page, in item (73), in "Assignee", delete "Caymon" and insert -- Cayman --, therefor.

Signed and Sealed this

Ninth Day of September, 2008

JON W. DUDAS
*Director of the United States Patent and Trademark Office*